Jan. 23, 1951 A. R. TRIST 2,539,287
ANTIFRICTION RING ELEMENT
Filed Aug. 28, 1947 4 Sheets-Sheet 3
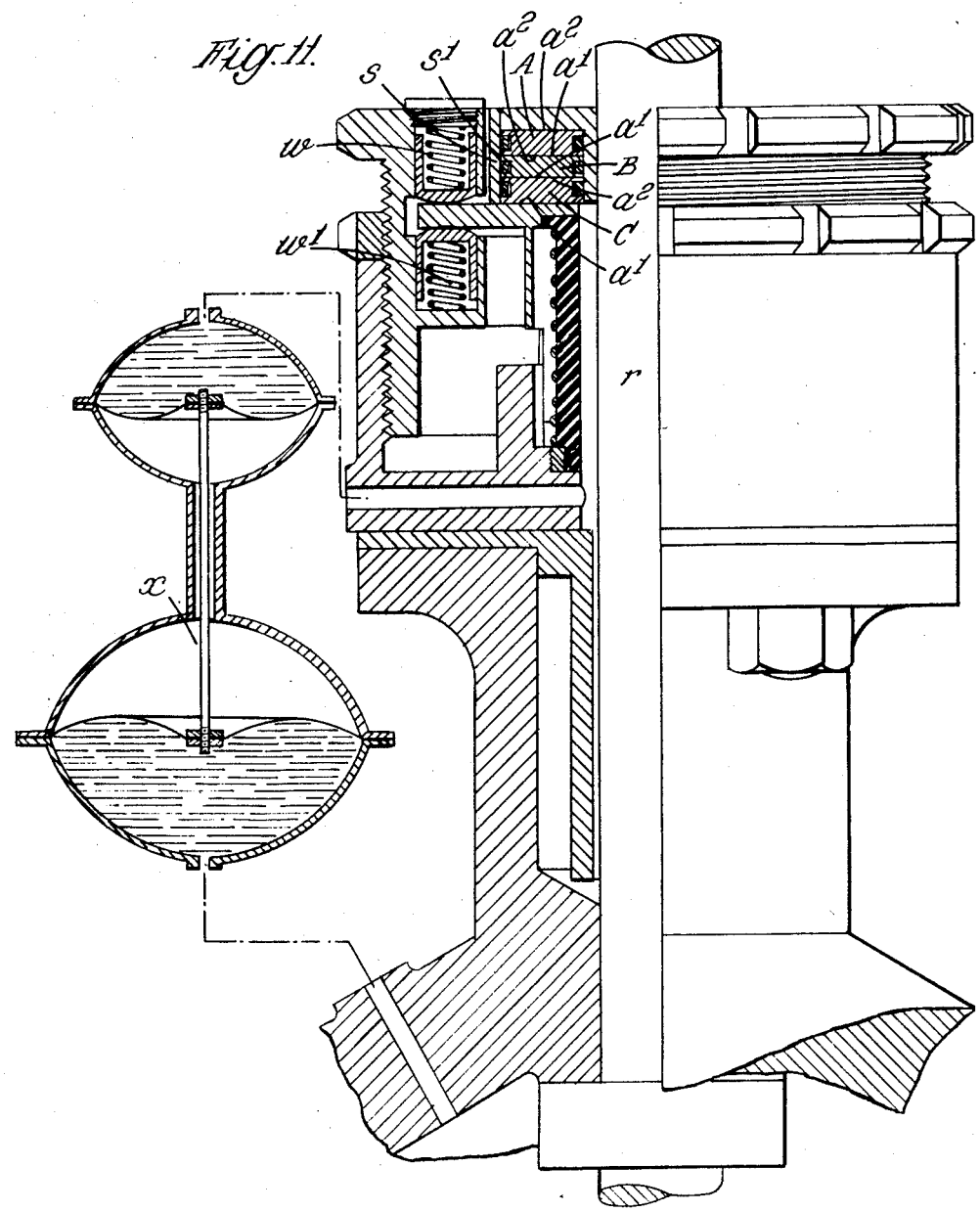
Arthur Ronald Trist
Inventor
By Richardson, Davis and Nordon
his Attorneys.

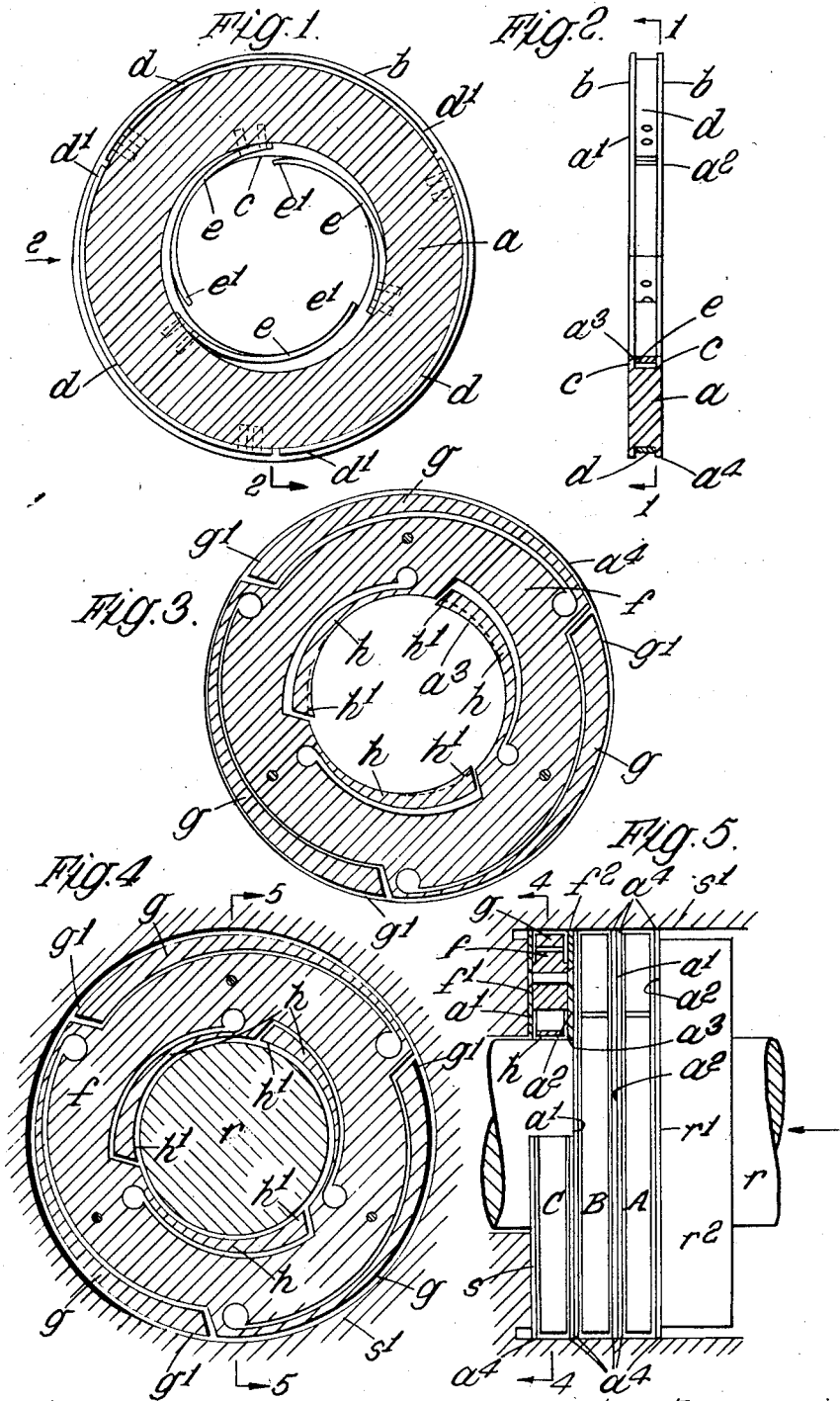

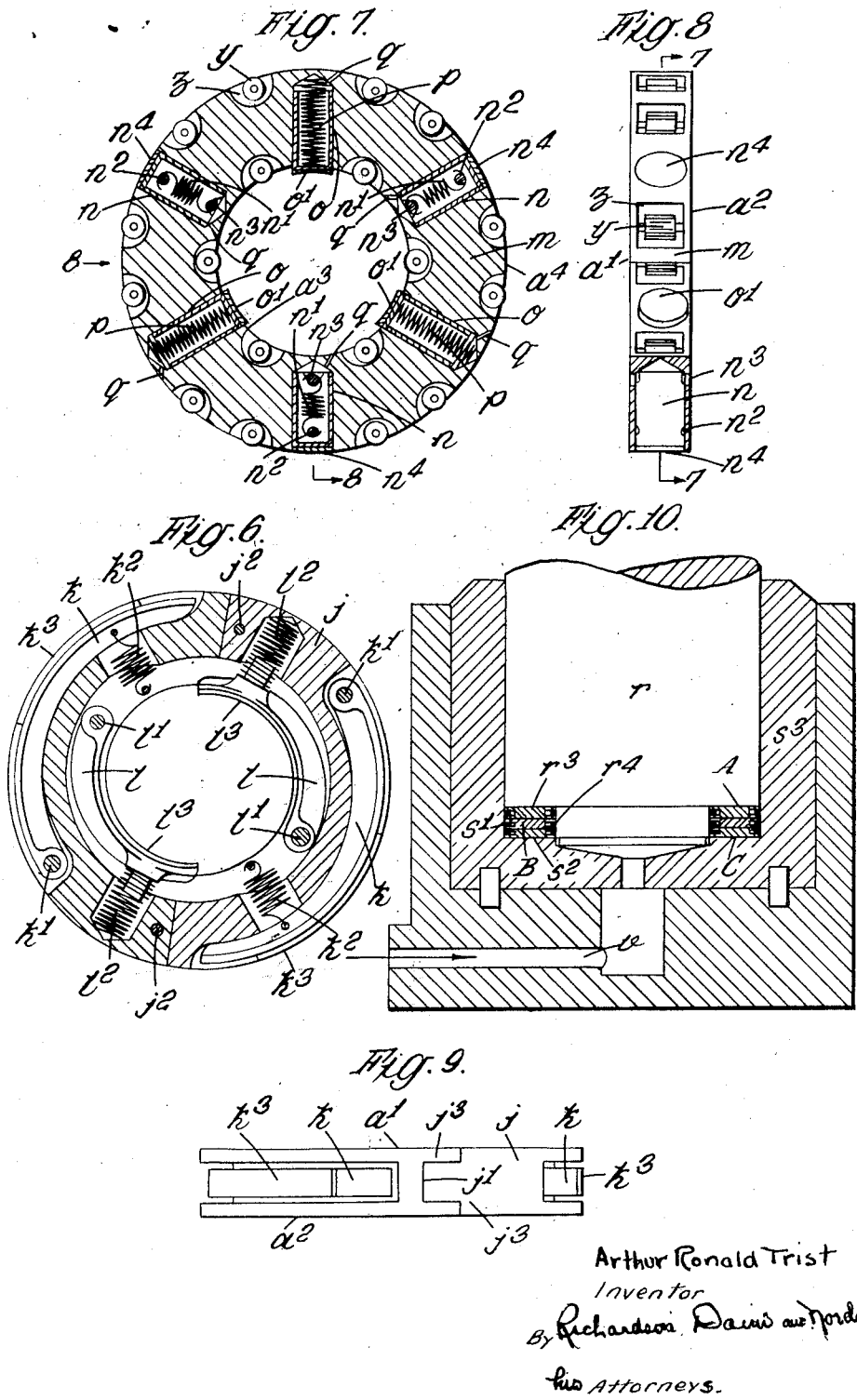

Jan. 23, 1951  A. R. TRIST  2,539,287
ANTIFRICTION RING ELEMENT
Filed Aug. 28, 1947  4 Sheets-Sheet 4
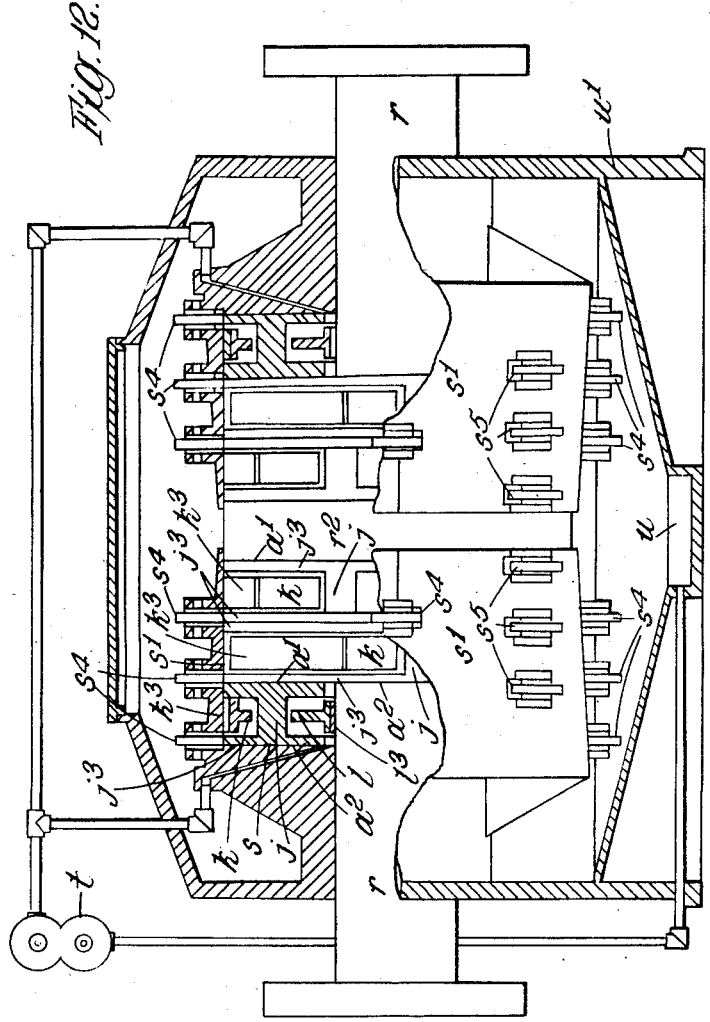
Arthur Ronald Trist
Inventor
By Richardson, David and Nordow
his Attorneys Patented Jan. 23, 1951

2,539,287

UNITED STATES PATENT OFFICE 2,539,287

ANTIFRICTION RING ELEMENT

Arthur Ronald Trist, Victoria, British Columbia, Canada

Application August 28, 1947, Serial No. 771,121
In Great Britain September 20, 1946

8 Claims. (Cl. 308—164)

This invention relates to improvements in antifriction ring elements that are interposed in thrust bearings or in the seals of rotating shafts and has for its object to provide means whereby the efficiency of such elements is increased in a simple and reliable manner.

Practice has demonstrated that when several rings are interposed between a lateral rotating surface, e. g. of a collar on a shaft, and a lateral stationary surface the rotation of the individual rings is quite haphazard and that frequently only one pair of surfaces slip thus reducing the efficiency of such an arrangement because the relative surface speed is not reduced or controlled.

This invention consists in an antifriction ring element comprising an anular body part, parallelly disposed flat thrust resisting surfaces on the sides of the body part, centrifugally responsive members disposed on the external periphery of the body part, an externally operative friction surface on the free end of each member, centrifugally responsive members disposed on the internal periphery of the body part, an internally operative friction surface on the free end of each of the last named members and springs to counteract movement of the members due to the centrifugal force induced by rotation of the body part.

The invention also contemplates a thrust resisting antifriction bearing having interposed ring elements in which the rotation of each ring element is centrifugally controlled so that the relative velocity between any pair of abutting lateral surfaces is the same at the same radius.

In order that the nature of this invention may be the better understood examples thereof will now be described in relation to the accompanying drawings, reference being had to the several figures and to the letters thereon, like letters referring to similar or equivalent parts in the different figures in which:

Figure 1 is a sectional elevation of one form of centrifugally controlled antifriction ring element;

Figure 2 is a side elevation of Figure 1 partly in section;

Figure 3 is a sectional elevation of a modified form of centrifugally controlled antifriction ring element;

Figure 4 is a sectional elevation of the ring element shown in Figure 3 associated with a stationary and a rotating cylindrical surface;

Figure 5 is a side elevation of Figure 4 partly in section;

Figure 6 is a sectional elevation of a further modified form of centrifugally controlled antifriction ring element;

Figure 7 is a sectional elevation of another modified form of centrifugally controlled ring element;

Figure 8 is a side elevation of Figure 7 partly in section;

Figure 9 is a side elevation of the ring element shown in Figure 6;

Figure 10 is a schematic elevation of a footstep bearing partly in section;

Figure 11 is a schematic arrangement of a packing for a rotating shaft with parts in sectional elevation, and Figure 12 is a schematic elevation of a thrust block for a ship's propeller with parts broken away.

In all cases each improved ring element is provided with two sets of centrifugally responsive friction surfaces that are spring-pressed towards the longitudinal axis of the shaft on which they are mounted, one set being disposed on the external periphery of the ring and one set being disposed on the internal periphery of the ring.

As shown in Figures 1 and 2 the improved ring element has an annular body part $a$ with external flanges $bb$, internal flanges $cc$ and lateral friction surfaces $a^1 a^2$.

One series of three centrifugally responsive members in the form of spring blades $ddd$ are mounted on the outside of the body part $a$ and disposed between the external flanges $bb$ and another series of three centrifugally responsive members in the form of spring blades $eee$ are mounted on the inside of the body part $a$ and disposed between the internal flanges $cc$.

As shown in Figure 3 the improved ring element has an annular body part $f$ and the external and internal margins respectively are cut to form two series of three centrifugally responsive members in the form of tongues, one set of three tongues $g$ being located on the outer periphery and another set of three tongues $h$ being located on the inner periphery.

In this arrangement the tongues $g$ and $h$ are slightly thinner than the body part $f$ to allow of freedom of action and flat circular plates $f^1 f^2$ are mounted on the sides of the body part $f$ to provide lateral friction surfaces $a^1$ and $a^2$, internal running surfaces $a^3$ and external running surfaces $a^4$.

As shown in Figures 6 and 9 the improved ring element has an annular part $f$ which for convenience of assembly in a large unit is made in two parts located by joggles $j^1$, is secured together by bolts $j^2$ and provides a roller track $j^3$ on each side of the external perimeter. The part $j$ has external recesses in which are housed two centrifugally responsive members in the form of levers $kk$ pivoted respectively at $k^1k^1$ and an internal recess in which are housed two centrifugally responsive members in the form of levers $ll$ pivoted respectively at $l^1l^1$, each of the levers $k$ being stressed radially inwards by a tension spring $k^2$ whilst each of the levers $l$ is pressed radially inwards by a compression spring $l^2$.

As shown in Figures 7 and 8 the improved ring element has an annular body part $m$ with six radial cylinders each of which is provided with a centrifugally responsive member in the form of a spring-stressed plunger.

Three of the cylinders open outwardly and contain plungers $nnn$ each of which is coupled to the body part $m$ by means of a tension spring $n^1$ and cross pins $n^2$ (in the plunger $n$) and $n^3$ (in the body part $m$) and three of the cylinders open inwardly and contain plungers $ooo$ each of which is pressed inwardly by a compression spring $p$.

To promote smoothness of operation the cylinders and plungers are arranged to function as dashpots and to this end each cylinder may have a bleed-hole such as $q$ at the closed end thereof.

The external surface $a^4$ and/or the internal surface $a^3$ may bear on the surface of the stationary cylindrical wall such as $s^1$ and/or on the surface of the shaft such as $r$ respectively so as to centre the ring elements and steady their operation and to reduce the friction as much as possible rollers such as $y$ may be rotatably mounted in pockets such as $z$ in the inner and/or outer periphery of each body part $m$.

The exteriors of the free ends of each of the centrifugally responsive members may provide friction surfaces due to the nature of the material of which the members are made or the free ends may be clothed with or have pads of friction provoking material (such as is used for clutch and brake surfaces) attached thereto.

As shown in Figures 1 and 2 the parts $d^1$ and $e^1$ of the springs $d$ and $e$ respectively and in Figures 3, 4 and 5 the parts $g^1$ and $h^1$ of the tongues $g$ and $h$ respectively provide natural friction surfaces; as shown in Figure 6 the levers $k$ and $l$ respectively have friction pads $k^3$ and $l^3$ mounted thereon; and as shown in Figures 7 and 8 the outer ends of each of the plungers $n$ and the inner ends of each of the plungers $o$ have friction pads $n^4$ and $o^1$ respectively mounted thereon.

The set of externally arranged friction surfaces are disposed so that on occasion they can, under the influence of centrifugal force, come into contact with the inner surface of a stationary cylindrical wall such as $s^1$ (see Figures 4 and 5) and the set of internally arranged friction surfaces are disposed so that at rest they are in contact with the cylindrical surface of the shaft on which they are mounted (see Figure 4).

Figures 4 and 5 show the assembly of three ring elements A, B and C, of the kind shown in Figure 3, with a central rotating shaft $r$ having a shoulder or collar $r^2$ and a stationary abutment $s$ and cylindrical wall $s^1$ it being assumed that all the parts are operating in the prescribed fashion.

As the shaft $r$ is rotating, motion is transmitted from the lateral surface $r^1$ of the collar $r^2$ to the lateral surface $a^2$ of the element A, thus causing the element A to rotate and transmit motion to the element B by the frictional co-operation of the lateral surface $a^1$ of element A and lateral surface $a^2$ of element B, the element B in turn transmitting motion to the element C by the frictional co-operation of the lateral surface $a^1$ of element B with lateral surface $a^2$ of element C, the thrust of the right-hand side of Figure 5 being resisted by the lateral surface $s$ of the stationary abutment.

By way of example, let it be assumed that the shaft $r$ has a speed of two thousand revolutions per minute then by the application of this invention it can be ensured that the element A in contact with the collar $r^2$ will be constrained to rotate at fifteen hundred revolutions per minute (a difference of five hundred revolutions per minute) that the element B will be constrained to rotate at one thousand revolutions per minute (again a difference of five hundred revolutions per minute) and that the element C will be constrained to rotate at five hundred revolutions per minute (again a difference of five hundred revolutions per minute) said element C having a speed relative to the stationary abutment $s$ of five hundred revolutions per minute so that although the shaft $r$ is rotating at two thousand revolutions per minute the friction between the lateral thrust surfaces is only that incidental to a speed of five hundred revolutions per minute.

If the speed of any element exceeds the prescribed value then the enhanced centrifugal force will cause the externally disposed series of centrifugally responsive members to bend or move outwardly to contact with the stationary cylindrical wall $s^1$ and set up a, or increase the, braking effect thus causing the speed of the element to be reduced and if the speed of any element is less than the prescribed value then the force of the springs stressing the internally disposed series of centrifugally responsive members will overcome the centrifugal force, more or less, and press the friction surfaces into contact with the shaft thus causing the speed of the element to be increased.

When the centrifugally responsive members are cantilevers such as $b$, $e$, $g$ or $h$ or pivoted levers such as $k$ or $l$ they may be arranged to trail on the surfaces with which they contact or may be disposed with the free ends facing the direction of motion as may be found to give the best results in a given set of circumstances and if necessary, the frictional contact may be augmented by servo-shoes.

The sets of springs or elastic tongues may be adjusted or constructed to provide two modes of control; in one mode of control all the springs stressing the externally disposed friction surfaces of a ring element may be adjusted to respond to centrifugal forces of the same value and all the springs stressing the internally disposed friction surfaces of the same ring element may be adjusted to respond to centrifugal forces of the same value which may be the same as the value of the centrifugal forces affecting the externally disposed friction surfaces or may be somewhat different therefrom and in the other mode of control the springs stressing the friction surfaces, both internally and externally disposed, may be adjusted to respond to centrifugal forces of slightly different values so that operation in sequence results.

The invention can be applied equally well to bearings resisting axial thrust e. g. the multiple surface thrust bearings of the tail shaft of a ship or the footstep bearing for a heavy rotor as well as to the seals for rotating shafts e. g. the sealing means for shafts of rotary or turbine pumps handling liquids that may have deleterious substances dissolved or suspended therein.

In the footstep bearing shown in Figure 10 the lower end of the vertical shaft $r$ is reduced for a short distance to provide a flat surface $r^3$ (that is the equivalent to $r^1$ of Figures 5 and 9) and a cylindrical surface $r^4$, three elements A, B and C being introduced between the surface $r^3$ and the surface $s^2$ of the bushing $s^3$. In this arrangement the centrifugally responsive members co-operate with the cylindrical surfaces $r^4$ and $s^1$ as already described and forced feed lubricant is supplied through the passage $v$.

In the seal of a rotating shaft as shown in Figure 11 the lateral surfaces $a^1$ and $a^2$ of the centrifugally controlled elements A, B and C are controllably pressed against one another by axial pressure produced by the series of springs $w$ and $w^1$ that act differentially and are lubricated under pressure by the differential hydraulic arrangement $x$ motivated by the pressure of the fluid being pumped.

In the thrust bearing of the tail shaft of a marine engine or the like as shown in Figure 12 three ring elements of the kind shown in Figures 6 and 9 are disposed on each side of the thrust collar $r^2$ on the shaft $r$ between the collar $r^2$ and stationary abutments $s$, of which one is shown on the left-hand side of Figure 12, oil under pressure being circulated by the pump $t$ from the sump $u$ of the bedplate $u^1$ to the abutments $s$ to maintain lubrication of the thrust resisting surfaces.

With this arrangement the thrust of the engines is properly applied to the propeller and hence to the ship in whichever direction the engines rotate.

To avoid unnecessary friction each of the ring elements is supported by two sets of rollers $s^4$ and $s^5$ mounted on the stationary cylindrical wall $s^1$ and to prevent unnecessary obstruction the set of rollers $s^4$ is shown displaced angularly in relation to the set of rollers $s^5$ but obviously this is only a matter of convenience and design as the rollers $s^4$ and $s^5$ may be arranged in any practical way.

As shown in Figure 12 there are four rollers in each set, the rollers $s^4$ being arranged on one track $j^3$ of a ring element, above, below, on the right and on the left, whilst the rollers $s^5$ are arranged on the other track $j^3$ of the ring element on diagonals.

What is claimed is:

1. An antifriction ring element comprising an annular body part, parallelly disposed flat thrust resisting surfaces on the sides of the body part, centrifugally responsive members disposed on the external periphery of the body part, an externally operative friction surface on the free end of each member to co-operate with a stationary cylindrical wall, centrifugally responsive members disposed on the internal periphery of the body part, an internally operative friction surface on the free end of each of the last-named members to co-operate with the surface of a shaft, and springs to counteract movement of the members due to the centrifugal force induced by rotation of the body part.

2. An antifriction ring element comprising an annular body part surrounding a rotating cylindrical surface, a stationary cylindrical surface surrounding the body part, parallelly disposed flat thrust resisting surfaces on the sides of the body part, centrifugally responsive spring blades mounted as cantilevers on the external periphery of the body part, an externally operative friction surface on the free end of each blade to co-operate with the stationary cylindrical surface, centrifugally responsive spring blades mounted as cantilevers on the internal periphery of the body part and an internally operative friction surface on the free end of each of the last-named blades to co-operate with the rotating cylindrical surface.

3. An antifriction ring element comprising an annular body part surrounding a rotating cylindrical surface, a stationary cylindrical surface surrounding the body part, parallelly disposed flat thrust resisting surfaces on the sides of the body part, centrifugally responsive elastic cantilever tongues formed in the external margin of the annular body part, an externally operative friction surface on the free end of each tongue to co-operate with the stationary cylindrical surface, centrifugally responsive elastic cantilever tongues formed in the internal margin of the annular body part and an internally operative friction surface on the free end of each of the last-named tongues co-operating with the rotating cylindrical surface.

4. An antifriction ring element comprising an annular body part surrounding a rotating cylindrical surface, a stationary cylindrical surface surrounding the body part, parallelly disposed flat thrust resisting surfaces on the sides of the body part, shoes pivoted on the external periphery of the body part, an externally operative friction surface on the free end of each shoe to co-operate with the stationary cylindrical surface, shoes pivoted on the internal periphery of the body part, an internally operative friction surface on the free end of each of the last-named shoes co-operating with the rotating cylindrical surface and springs to counteract movement of the shoes due to centrifugal force induced by rotation of the body part.

5. An antifriction ring element comprising an annular body part surrounding a rotating cylindrical surface, a stationary cylindrical surface surrounding the body part, parallelly disposed flat thrust resisting surfaces on the sides of the body part, externally opening cylinders in the body part, a plunger in each cylinder, a friction pad on the outer end of each plunger to co-operate with the stationary cylindrical surface, inwardly opening cylinders in the body part, a plunger in each of the last-named cylinders, a friction pad disposed on the inner end of each of the last-named plungers co-operating with the rotating cylindrical surface and springs to counteract movement of the plungers due to centrifugal force induced by rotation of the body part.

6. In an antifriction ring element as claimed in claim 5 the arrangement of a bleedhole from each cylinder to control the speed of movement of the plunger in the cylinder due to centrifugal force induced by rotation of the body part.

7. A thrust resisting antifriction bearing having in combination a shaft, a thrust collar on the shaft, a stationary annular thrust abutment coaxial with the shaft, a stationary cylindrical wall coaxial with the shaft, ring elements on the shaft transmitting thrust from the collar to the abutment, a peripheral track on each element, first members movably mounted on the exterior of each element, springs restraining outward movement of the first members, a friction surface externally arranged on each first member to co-operate with the wall to decelerate the element when the first member is urged by centrifugal force against the action of its spring, second members movably mounted on the interior of each element, springs restraining movement of the second members away from the surface of the shaft, a friction surface internally arranged on each second member to co-operate with the surface of the shaft until the second member is urged by centrifugal force against its spring and antifriction means mounted on the wall to co-operate with the peripheral tracks on all the elements.

8. In a thrust resisting antifriction bearing as claimed in claim 7 the arrangement of a plurality of ring elements on each side of the thrust collar on the shaft, and two stationary thrust abutments to resist thrust in two directions.

ARTHUR RONALD TRIST.

REFERENCES CITED

The following references are of record in the file of this patent:

UNITED STATES PATENTS

| Number | Name | Date |
|---|---|---|
| 229,171 | Osenbruck | June 22, 1880 |